United States Patent
Fukao et al.

(10) Patent No.: US 7,427,992 B2
(45) Date of Patent: Sep. 23, 2008

(54) COLOR CORRECTION TABLE COMPILING METHOD, CONTROLLING PROGRAM, RECORDING MEDIUM, AND DEVICE

(75) Inventors: Suzuko Fukao, Ohta-ku (JP); Kimitaka Arai, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 839 days.

(21) Appl. No.: 10/664,204

(22) Filed: Sep. 16, 2003

(65) Prior Publication Data

US 2004/0091148 A1    May 13, 2004

(30) Foreign Application Priority Data

Sep. 30, 2002  (JP)  ............................. 2002-286048

(51) Int. Cl.
 *G09G 5/02* (2006.01)
 *G06K 9/00* (2006.01)
(52) U.S. Cl. ........................ 345/589; 345/581; 345/601; 382/167
(58) Field of Classification Search ................. 345/589
 See application file for complete search history.

(56) References Cited

U.S. PATENT DOCUMENTS

| | | | | |
|---|---|---|---|---|
| 4,929,978 A | * | 5/1990 | Kanamori et al. | ............. 355/38 |
| 5,357,353 A | * | 10/1994 | Hirota | ........................ 358/530 |
| 5,619,427 A | * | 4/1997 | Ohkubo | ....................... 358/523 |
| 5,781,206 A | * | 7/1998 | Edge | ............................ 347/19 |
| 5,902,052 A | * | 5/1999 | Hayashi | ................. 400/120.02 |
| 6,269,184 B1 | * | 7/2001 | Spaulding et al. | ........... 382/167 |
| 6,724,507 B1 | * | 4/2004 | Ikegami et al. | .............. 358/518 |
| 7,136,523 B2 | | 11/2006 | Fukao et al. | |
| 2001/0009463 A1 | * | 7/2001 | Kuno et al. | ................... 357/1.9 |
| 2002/0048031 A1 | * | 4/2002 | Suwa et al. | ................... 358/1.9 |
| 2002/0136302 A1 | * | 9/2002 | Lu | ......................... 375/240.16 |
| 2003/0081831 A1 | | 5/2003 | Fukao et al. | |

FOREIGN PATENT DOCUMENTS

JP    2001-016476 A    1/2001
JP    2003-179764      6/2003

* cited by examiner

*Primary Examiner*—Kee M. Tung
*Assistant Examiner*—Michelle K Lay
(74) *Attorney, Agent, or Firm*—Canon U.S.A. Inc IP Division (57) ABSTRACT

Color values of a color space are stored in a color correction table. A smoothing process is performed on achromatic color values to remove artifacts and prevent image degradation caused by the correction process. The color values obtained from the smoothing process may also be adjusted for projection onto the achromatic axis.

12 Claims, 12 Drawing Sheets

| STEPS OF R VALUE : 0,43,85,...,212,255 |
|---|
| STEPS OF G VALUE : 0,43,85,...,212,255 |
| STEPS OF B VALUE : 0,43,85,...,212,255 |
| RGB VALUE OF grid(0,0,0) AFTER CORRECTION : (0,0,0)<br>RGB VALUE OF grid(0,0,1) AFTER CORRECTION : (0,3,45)<br>•<br>•<br>RGB VALUE OF grid(0,0,6) AFTER CORRECTION : (2,10,253)<br>RGB VALUE OF grid(0,1,0) AFTER CORRECTION : (2,254,55)<br>•<br>•<br>RGB VALUE OF grid(6,6,5) AFTER CORRECTION : (253,255,220)<br>RGB VALUE OF grid(6,6,6) AFTER CORRECTION : (255,255,225) |

COLOR CORRECTION TABLE COMPILING METHOD, CONTROLLING PROGRAM, RECORDING MEDIUM, AND DEVICE

BACKGROUND OF THE INVENTION

1. Field of the Invention

The present invention relates to a color correction table compiling method, a control program, a recording medium, and a device.

2. Description of the Related Art

In general, image color can vary between images displayed on a color monitor and the same images when printed on a printer. This may be due to gamut differences or color reproduction differences between the monitor and the printer. Accordingly, there is the need to perform color matching to adjust color so that the way the monitor displays color and the printed color match. As an example of color matching processing, an interpolated color correction lookup table (hereafter, "color correction table") based upon color properties of the monitor and the printer can be employed.

However, the color correction table can contain errors due to various types of noise such as measurement and/or quantization errors. Such noise can cause: the smoothness of the conversion curve obtained from the color correction table to become deteriorated. As a result, artifacts or the like are present when the image is printed.

Conventional systems for smoothing color correction table values in order to remove noise are known. In Japanese Patent Laid-Open No. 2003-179764, for example, values of the color correction table corresponding to achromatic color (R=G=B) are kept the same in order to keep achromatic data values of the input image achromatic during color conversion.

However, when the color correction table values corresponding to achromatic color are used without change as in the above-described conventional method, achromatic colors are not subjected to smoothing. In some cases, this can result in artifacts due to deterioration of the smoothness of the tone sequence, and in particular, on a gradation image with complementary colors containing achromatic color in between.

SUMMARY OF THE INVENTION

The present invention has been made to solve the above problems, and accordingly it is an object thereof to provide a method wherein smoothing is performed for color values corresponding to achromatic color. The smoothing process uses colors surrounding the color values, and also maintains the achromatic nature of the color values. This process causes artifacts and noise occurring around achromatic color to be suppressed, thereby improving image quality.

As means for achieving the above-described object, a color correction table compiling method of the present invention includes a configuration described below.

A color correction table compiling method according to the present invention, comprises: receiving input color values of a color space stored in the color correction table; smoothing the input color values to provide first color values; in the event that the first color values do not correspond to achromatic color due to the smoothing and the input color values correspond to achromatic color, adjusting the first color values to provide second color values corresponding to the achromatic color in the color space; and storing the second values in the color correction table.

Adjusting may be performed so that the second value is converted to a value on the achromatic axis, or may be performed so that the second value is projected onto the achromatic axis in the color space. The method may further comprise defining selected conditions for performing the smoothing, and the smoothing conditions may comprise limit values as to the amount of change between the color values before and after smoothing, and further, the smoothing conditions may be each set for achromatic color and other colors. Also, the smoothing conditions for achromatic color may be based upon limit values as to the amount of change in color at a plurality of positions on the achromatic axis.

Furthermore, the method may further comprise providing a control program and a computer for executing the method for compiling a color correction table.

Furthermore, the method may further comprise providing a storage medium for storing the control program.

Furthermore, a device for compiling a color correction table having color values in a color space, comprises: a smoothing unit for performing smoothing for values in achromatic color in the color space; and a correction unit for adjusting the first values into second values corresponding to achromatic color, in the event that the first values do not corresponds to achromatic color due to the smoothing.

Further objects, features and advantages of the present invention will become apparent from the following description of the preferred embodiments (with reference to the attached drawings).

DESCRIPTION OF THE PREFERRED EMBODIMENTS

First Embodiment

Figure 1:
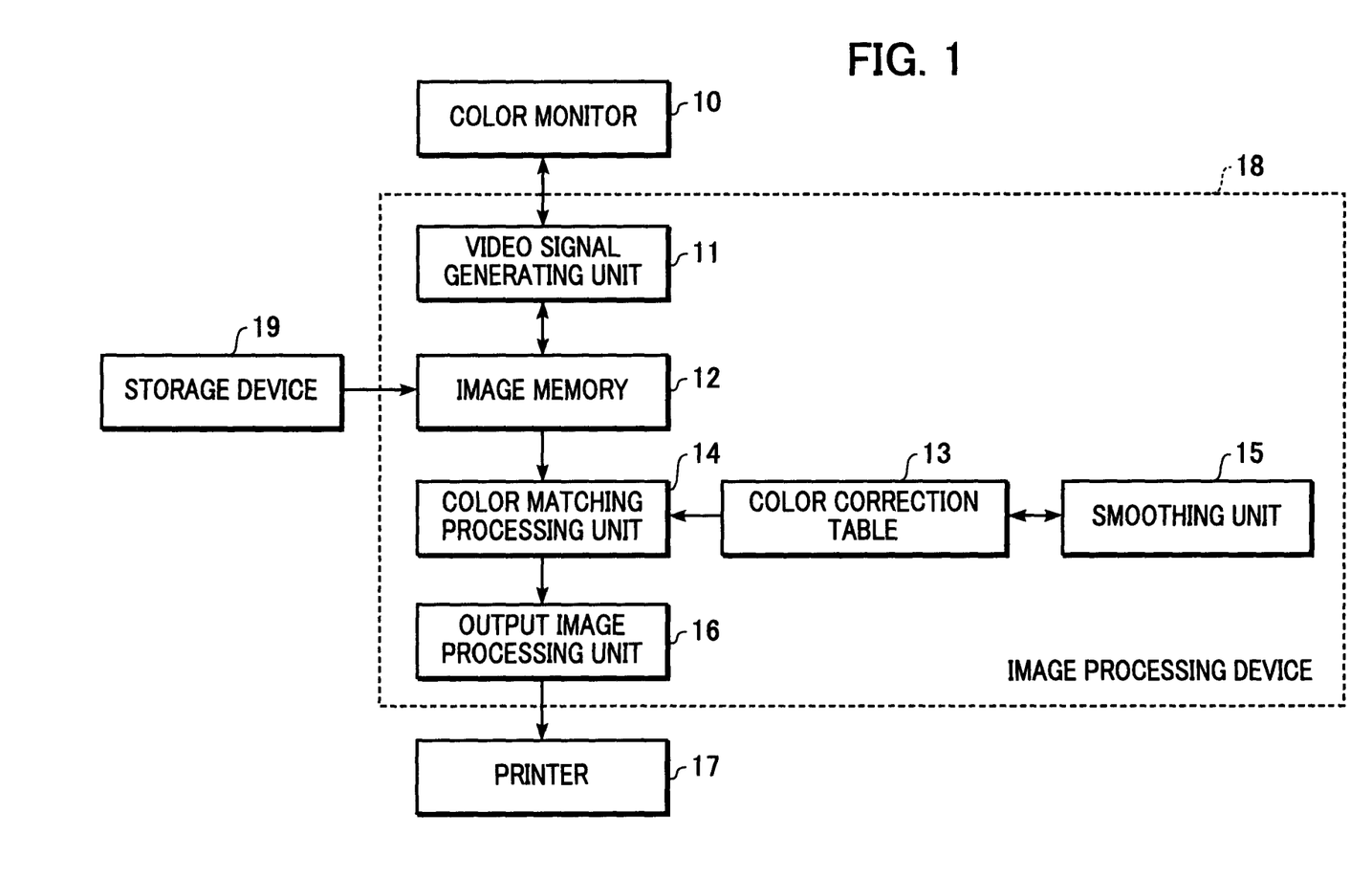
FIG. 1 is a block diagram, which illustrates a configuration of an image processing device to which a color adjustment device according to a first embodiment of the present invention is applied.

FIG. 1 is a block diagram, which illustrates a configuration of an image processing device according to a first embodiment of the present invention. As shown in FIG. 1, a color monitor 10 for displaying an image and a printer 17 for printing the image on a recording medium are connected to an image processing device 18. The image processing device 18 includes a video signal generating unit 11 for converting image data into video signals.

Image memory 12 stores temporarily image data and permanently stores the image data in a storage device 19 such as a hard disk or the like. A color correction table 13 stores the relation between printed color and color displayed on a monitor. A color matching processing unit 14 performs color matching between the displayed color and the printed color. A smoothing unit 15 performs the smoothing process for data stored in the color correction table 13. An output image processing unit 16 converts the image data into signals for driving printers.

The image data to be processes may include data digitized by an image input device such as a digital camera, scanner, computer graphics (CG) generated data and the like. Further the image data is stored in the image memory 12 as pixel values corresponding to luminance. Each pixel value is an 8 bit value representing red (R), green (G), and blue (B).

In FIG. 1, the color monitor 10 is a display device such as a CRT, an LCD, or the like. The printer 17 uses ink jet technology that affixes printing inks cyan (C), magenta (M), yellow (Y), and black (K) to a substrate such as paper. Note that other types of color monitors and printers using other methods such as electrophotographic printers, thermal transfer printers, or the like, may be employed by the present invention.

The color correlation table 13 is used for color correction processing for the input RGB values based upon the output properties of the printer 17, and accordingly stores the relation between color coordinates of regular spaced grids in the RGB color space and the color coordinates subjected to color correction processing.

Figure 2:
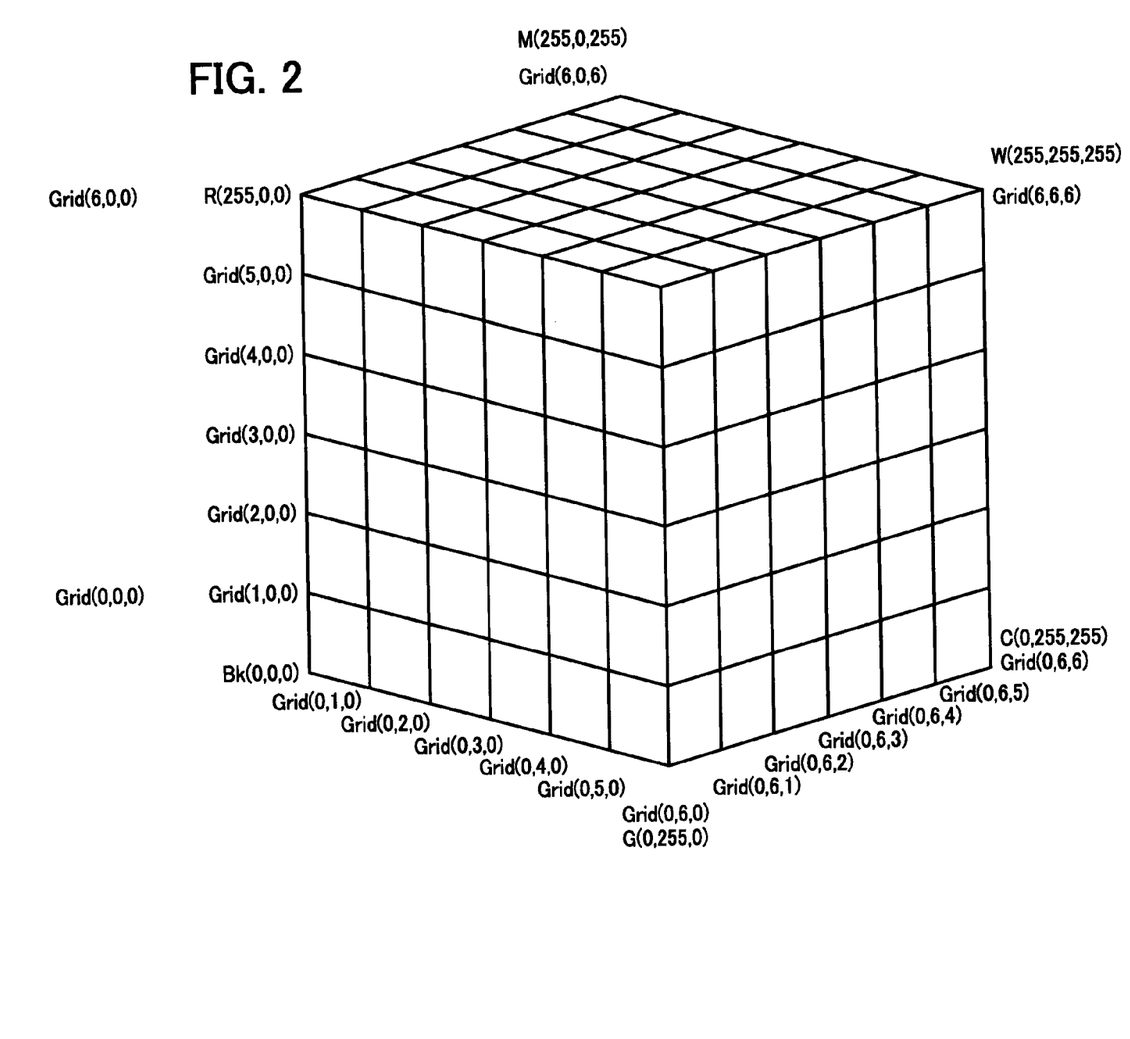
FIG. 2 is a schematic diagram, which illustrates a layout of grid points before color correction processing in the RGB space.
Figure 3:
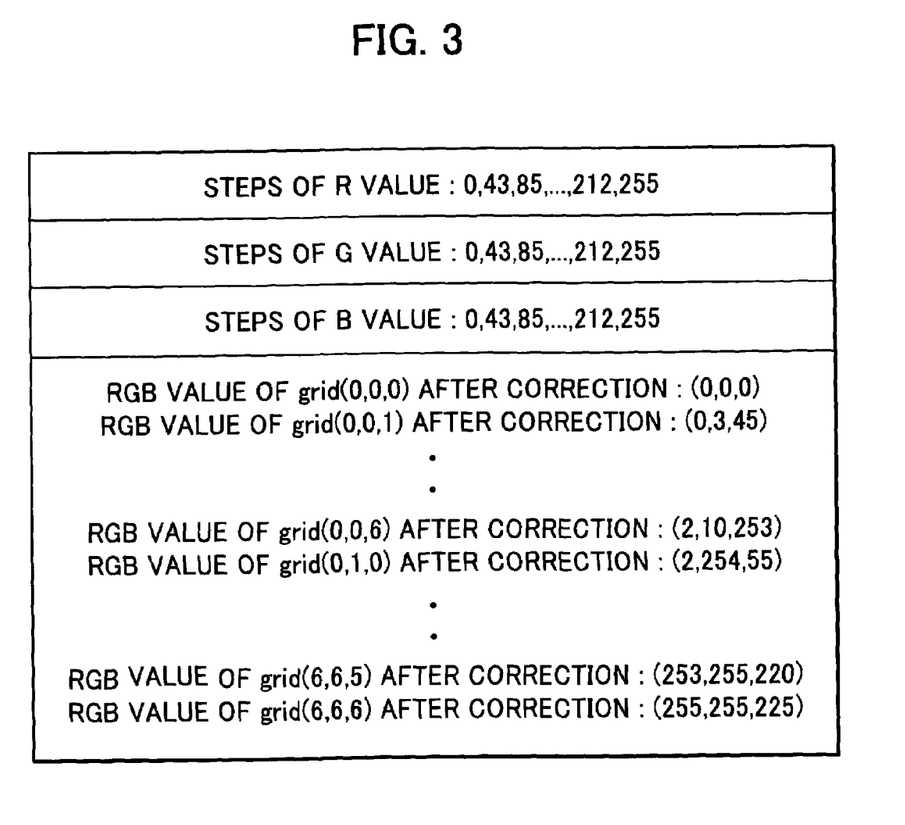
FIG. 3 is a diagram which shows data rows held by a color correction table.

FIG. 2 is a schematic diagram, which illustrates the grid points in RGB color space before color correction processing is employed. FIG. 2 shows R-axis, G-axis, and B-axis, each having seven grid points. Each grid point, e.g., Grid(6, 0, 6) is a coordinate representable by a R value, a G value, and B value that can represent the primary additive and subtractive colors namely magenta, e.g., M(255, 0, 255), black (Bk), green (G), red (R), cyan (C), and white (W). FIG. 3 shows the color correction table 13 in detail. As shown, the color correction table stores step values for each of R-values, G-values, and B-values, and further stores RGB values obtained after color correction.

Figure 4:
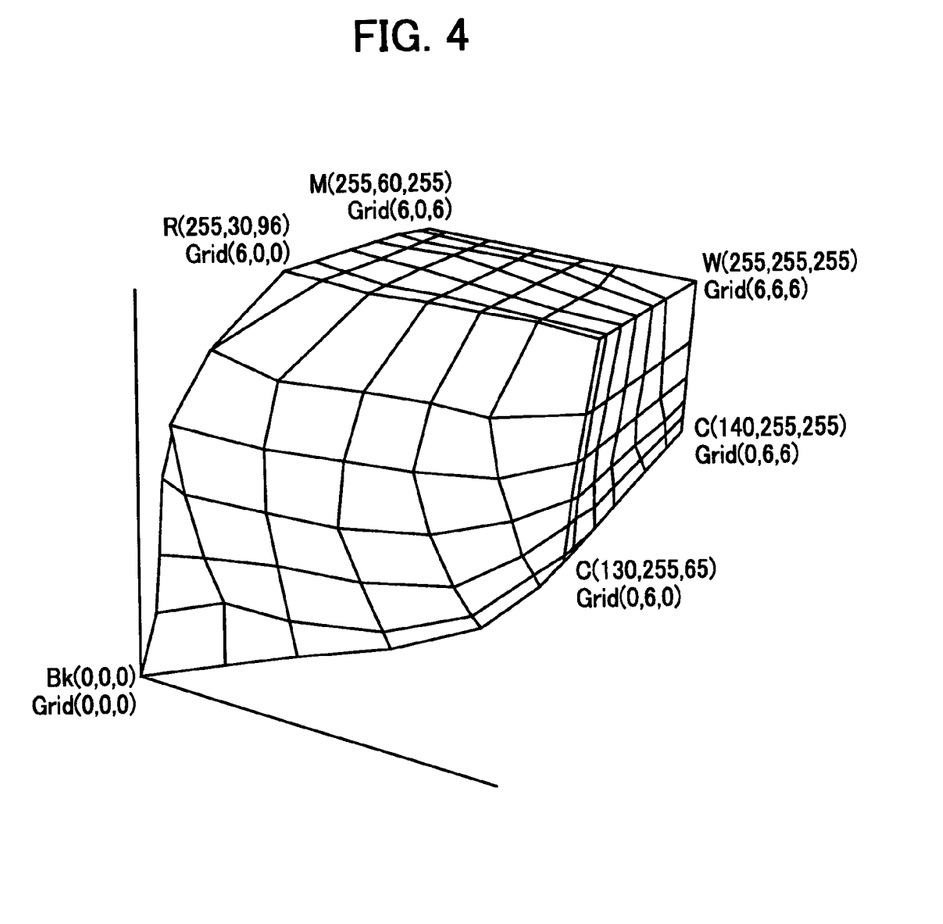
FIG. 4 is a schematic diagram, which illustrates a layout of grid points after color correction processing in the RGB space.

FIG. 4 is a schematic diagram, which illustrates grid points after color correction processing using the color correction table 13. FIG. 4 shows the RGB values after color correction and the grid number of the grid coordinates, corresponding to the representative points of black (Bk), green (G), red (R), cyan (C), magenta (M), and white (W).

Referring to the image processing device shown in FIG. 1, the image data input from the storage device 19 and stored in the image memory 12 is input to the color matching processing unit 14. The color matching processing unit 14 performs color matching for the image displayed on the color monitor 10 via the video signal generating unit 11, and the output image printed by the printer 17 via the output image processing unit 16. Specifically, the output value corresponding to each pixel value of the image data is obtained by performing interpolation with reference to the color correction table 13. Subsequently, the output image processing unit 16 controls the ink emission for each ink of C, M, Y, and K, according to the input RGB pixel value, whereby desirable color is manifested on a recording medium by the printer 17.

Figure 5:
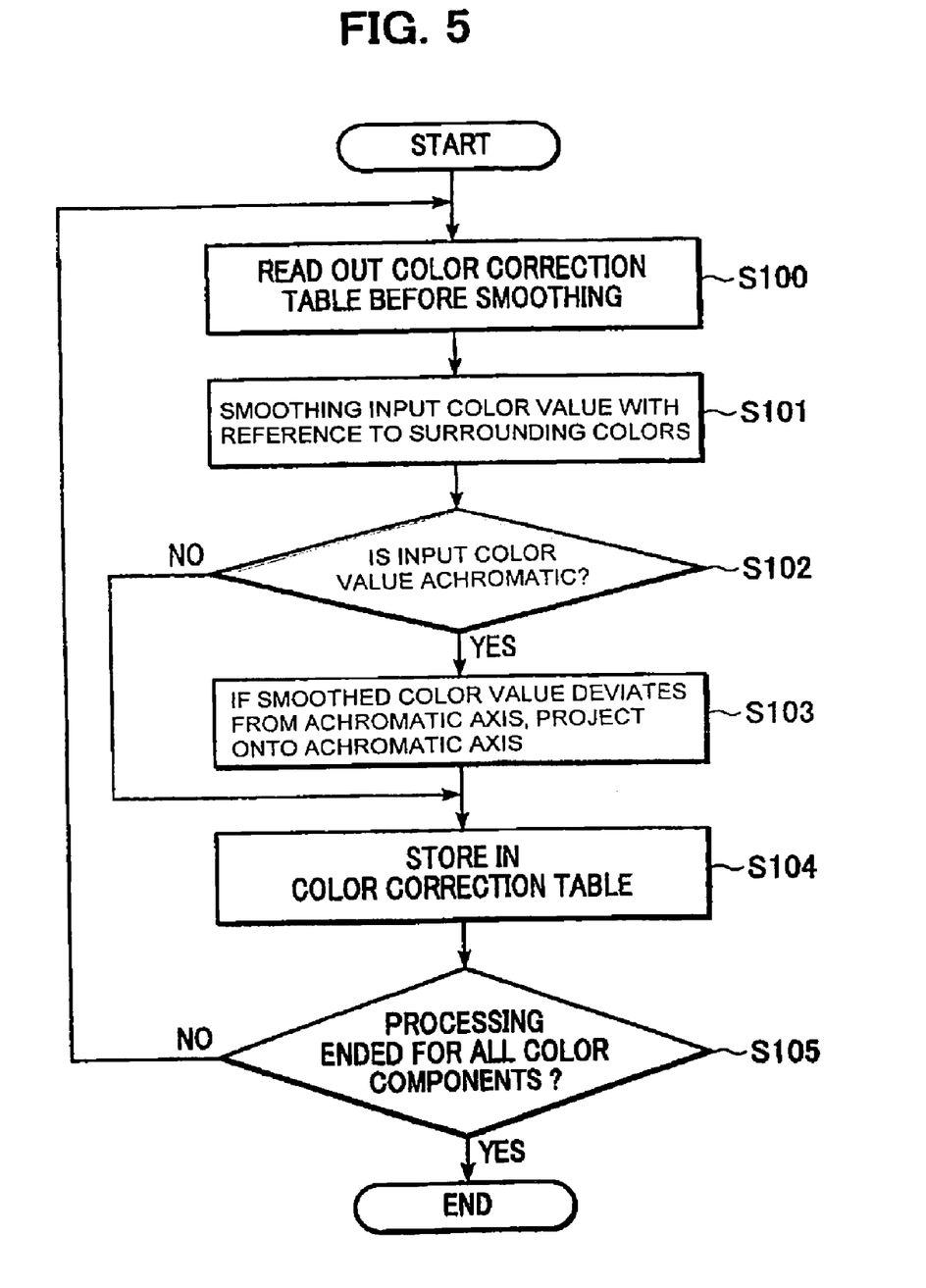
FIG. 5 is a flowchart, which shows smoothing process.

Processing performed by the smoothing unit 15 will now be described with reference to a flowchart shown in FIG. 5. In Step S100, the smoothing unit 15 reads out the RGB values stored in the color correction table 13. Next, in Step S101, the smoothing unit 15 performs smoothing for the RGB values read out by the smoothing unit 15. The smoothing process may be performed by using Gaussian filtering or by averaging adjacent RGB values for each of the R, G, and B color axes. Subsequently, in Step S102, it is determined whether with the input RGB value, i.e., with the read RGB value prior to smoothing, the relation $R=G=B$ holds. If this input RGB value prior to smoothing is achromatic, the flow proceeds to Step S103. Further in Step 103, if the RGB value after smoothing deviates from the achromatic axis, it is adjusted so that the RGB value after smoothing is returned to a value on the achromatic axis.

Figure 6:
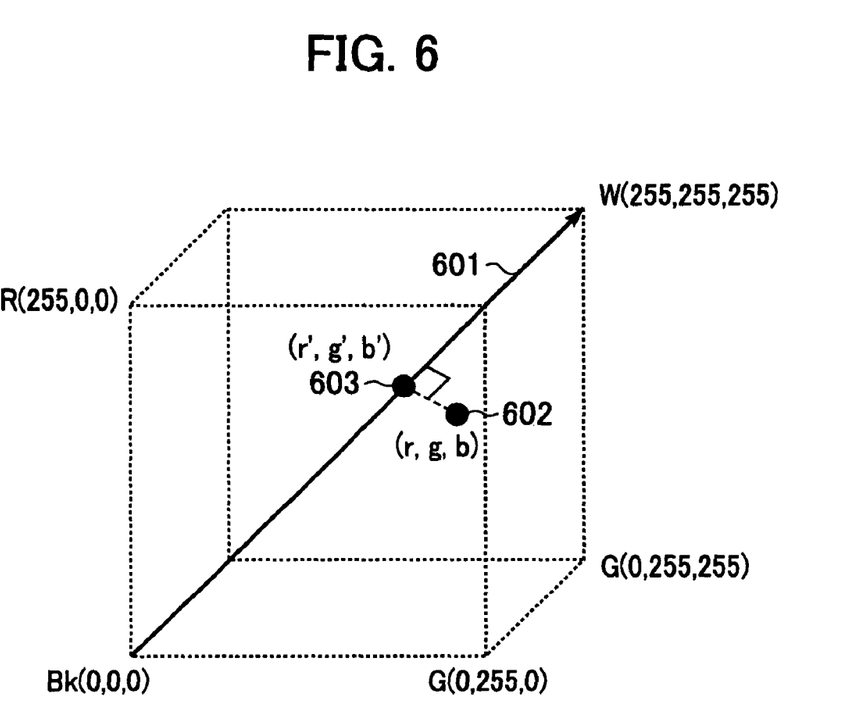
FIG. 6 is a diagram for describing processing for adjusting a gray value deviating from the achromatic axis to return the value to the achromatic axis.

FIG. 6 is a diagram for describing the aforementioned Step S103, wherein reference numeral 601 denotes the achromatic axis, reference numeral 602 denotes a point deviating from the achromatic axis 601 due to the smoothing process in Step S101, and reference numeral 603 denotes a point after adjustment. With the RGB value at the point 602 deviating from the achromatic axis 601 represented as (r, g, b), and with the RGB value at the point 603 after adjustment represented as (r', g', b'), the RGB value (r', g', b') is obtained from the expression $r'=g'=b'=(r+g+b)/3.$ Referring again to FIG. 5, in Step S104, the RGB value after smoothing (and adjustment) is stored in the color correction table 13. Subsequently, the flow proceeds to Step S105, wherein if processing has ended for all the components of the color correction table 13, the processing by the smoothing unit 15 ends. Conversely, if processing has not ended for all the components of the color correction table 13, the processing in Steps S100 through S104 is repeated for the following RGB value.

With the above-described method, the RGB value corresponding to achromatic color is subjected to smoothing with reference to surrounding colors while keeping the RGB value after smoothing in achromatic color. Thus, artifacts due to color matching processing can be reduced on a gradation image containing color components on the gray axis.

Second Embodiment

With a second embodiment of the present invention, in addition to functions of the above-described first embodiment, the user can set limit values for the amount of change in the RGB value from smoothing. Note that the image processing device according to the second embodiment has the same configuration as with the above-described image processing device 18 according to the first embodiment.

Figure 7:
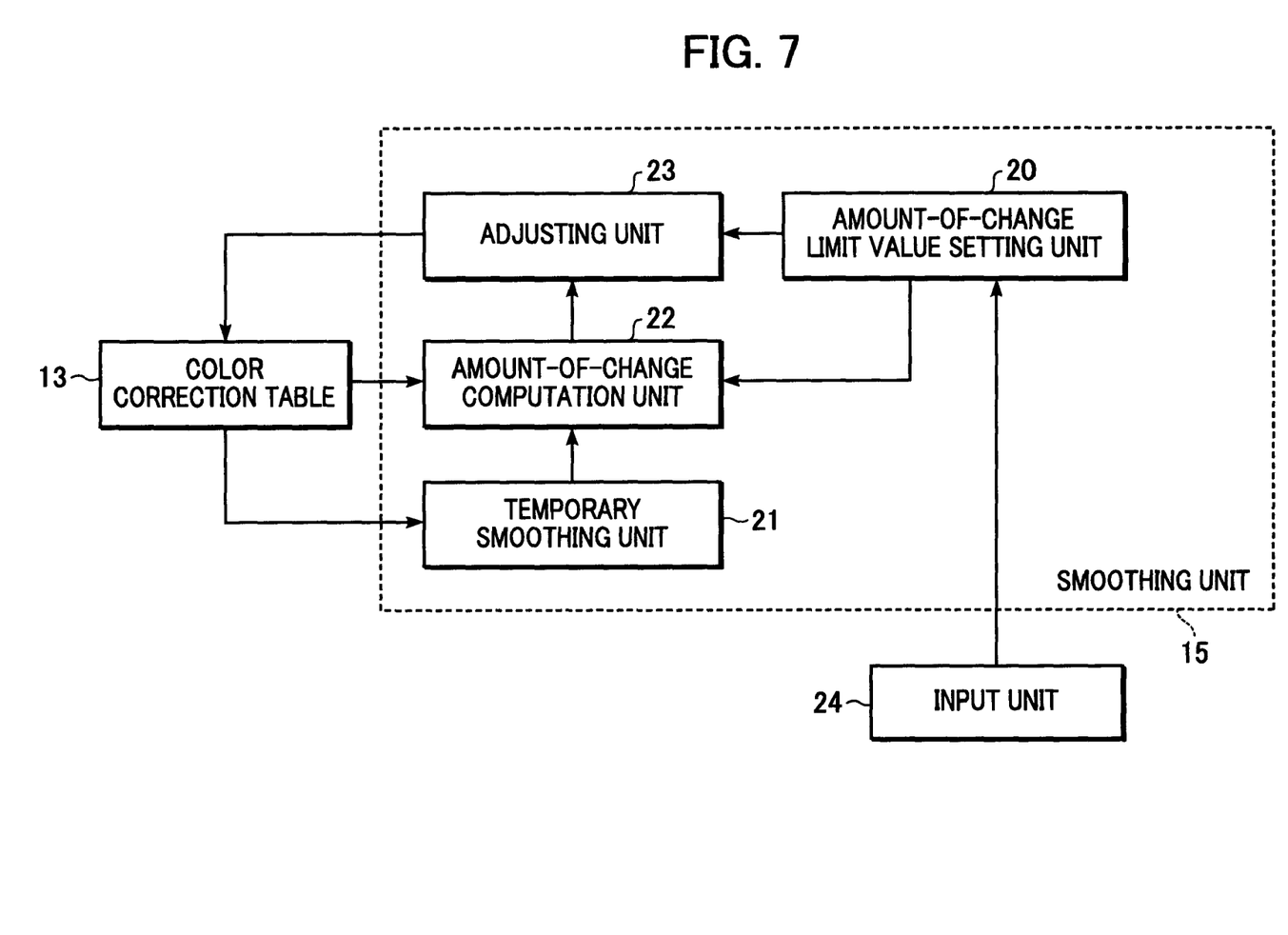
FIG. 7 is a block diagram, which illustrates a configuration of a color adjustment device according to a second embodiment of the present invention.

FIG. 7 is a block diagram, which illustrates a configuration of the smoothing unit 15 according to the present embodiment. In FIG. 7, an amount-of-change limit value setting unit 20 sets limit values as to the amount of change between the RGB values, stored in the color correction table, before and after smoothing using the user input values from an input unit 24. A temporary smoothing unit 21 performs smoothing for the RGB values. An amount-of-change computation unit 22 calculates the color difference ΔE between the RGB values before and after the smoothing process performed by the temporary smoothing unit 21. An adjusting unit 23 adjusts the RGB value obtained by the temporary smoothing unit 21 based upon the color difference ΔE obtained by the amount-of-change computation unit 22, and stores the adjusted RGB value in the color correction table 13.

Figure 8:
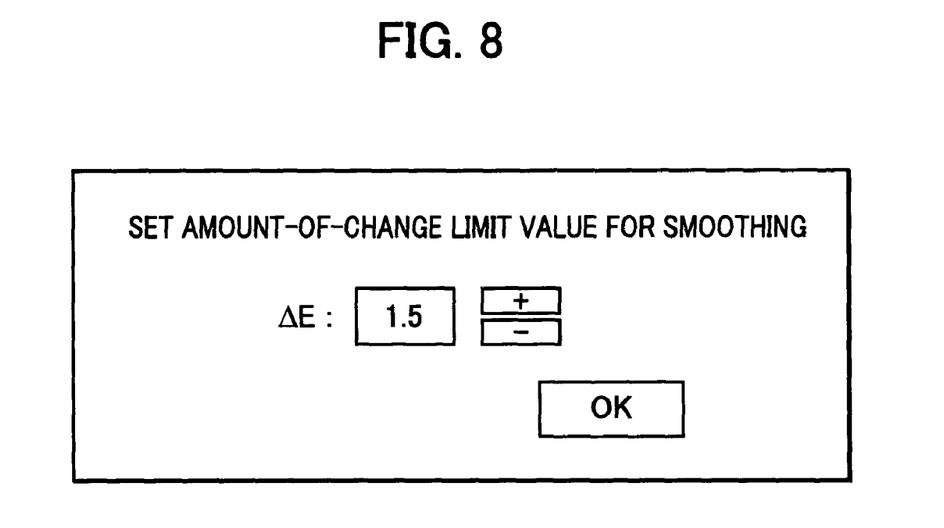
FIG. 8 is a diagram, which illustrates an example of a display screen for setting limit values as to the amount of change due to smoothing.

FIG. 8 shows an example of the display screen for the amount-of-change limit value setting unit 20. The user sets the amount-of-change limit value as the difference ΔE between the RGB values before and after smoothing. For example, in FIG. 8, the color difference ΔE has a value of 1.5.

Figure 9:
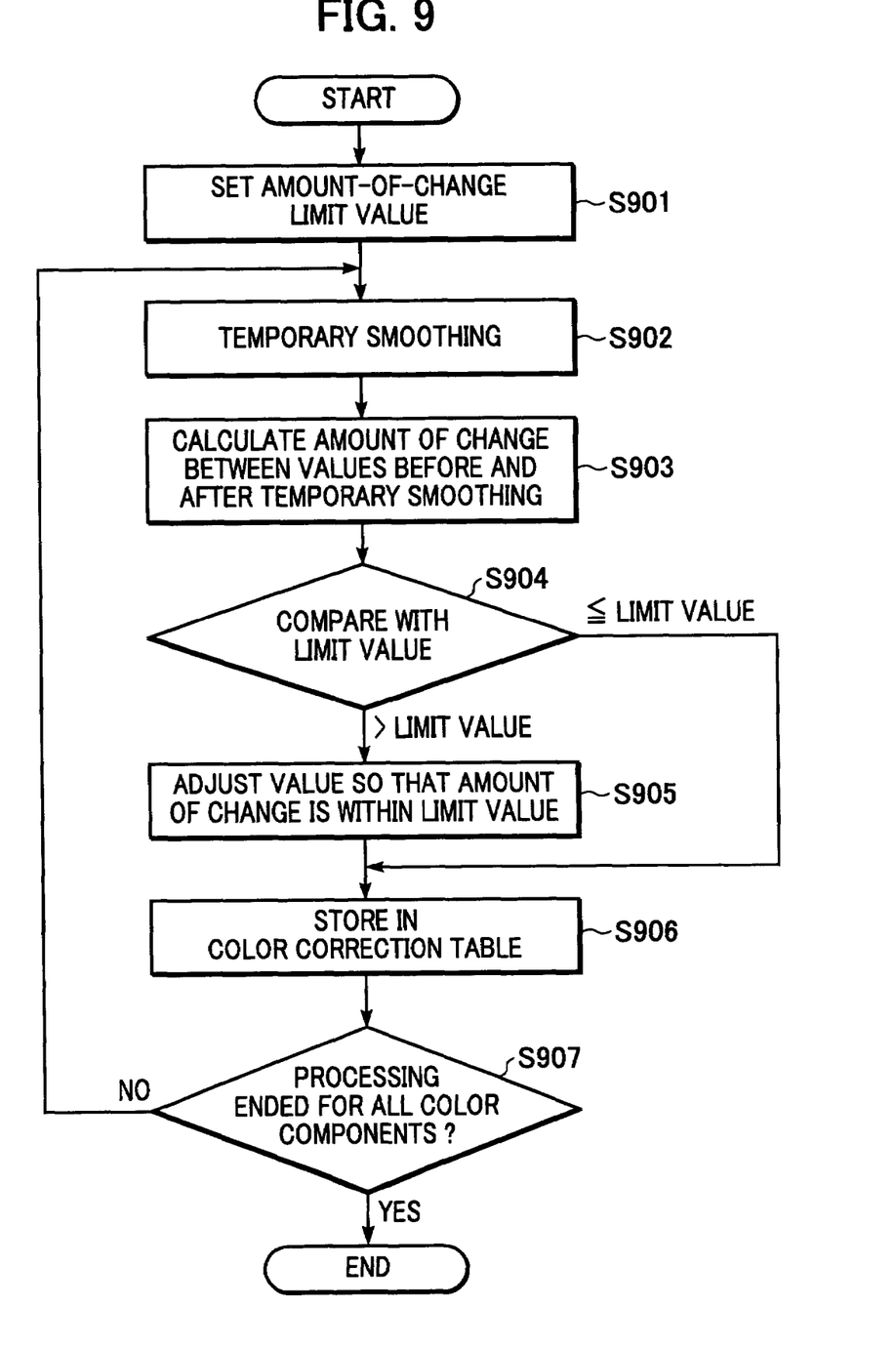
FIG. 9 is a flowchart, which shows smoothing process according to the second embodiment of the present invention.

Processing performed by the smoothing unit 15 will now be described according to the present embodiment with reference to a flowchart shown in FIG. 9. First, in Step S901, the amount-of-change limit value setting unit 20 sets the amount-of-change limit value. Next, in Step S902, the temporary smoothing unit 21 performs the smoothing process (which will be referred to as "temporary smoothing" hereafter) for each value stored in the color correction table 13 in a similar way as with in Steps S100 through S105 according to the first embodiment. Subsequently, in Step S903, the amount-of-change computation unit 22 calculates the color difference ΔE between the RGB value subjected to temporary smoothing in Step S902 and the RGB value before temporary smoothing. The color difference ΔE between the RGB values before and after temporary smoothing is calculated as described below. First, patch images before and after smoothing are formed on the computer system with the color-coordinates of regularly spaced grids formed in the RGB color space. Color patches for the patch images are output from the printer, and color measurement is performed for the output image, whereby the L*a*b* color value corresponding to each color patch is obtained. Subsequently, the L*a*b* color values corresponding to the color correction table 13 before and after smoothing are obtained using interpolation and the results from the aforementioned color measurement. The color difference ΔE is calculated from the two L*a*b* color values. The color difference ΔE between the RGB values before and after smoothing is also calculated with RGB-Lab conversion calculation based upon psychological attribute stipulated by CIECAM97s. In Step S904, the adjusting unit 23 compares the color difference ΔE calculated in Step S903 with the aforementioned amount-of-change limit value. If the aforementioned ΔE is greater than the limit value, the flow proceeds to Step S905, otherwise, the flow proceeds to Step S906. In Step S905, the adjusting unit 23 adjusts the RGB value after temporary smoothing so that the aforementioned color difference ΔE is within the aforementioned amount-of-change limit value.

Figure 10:
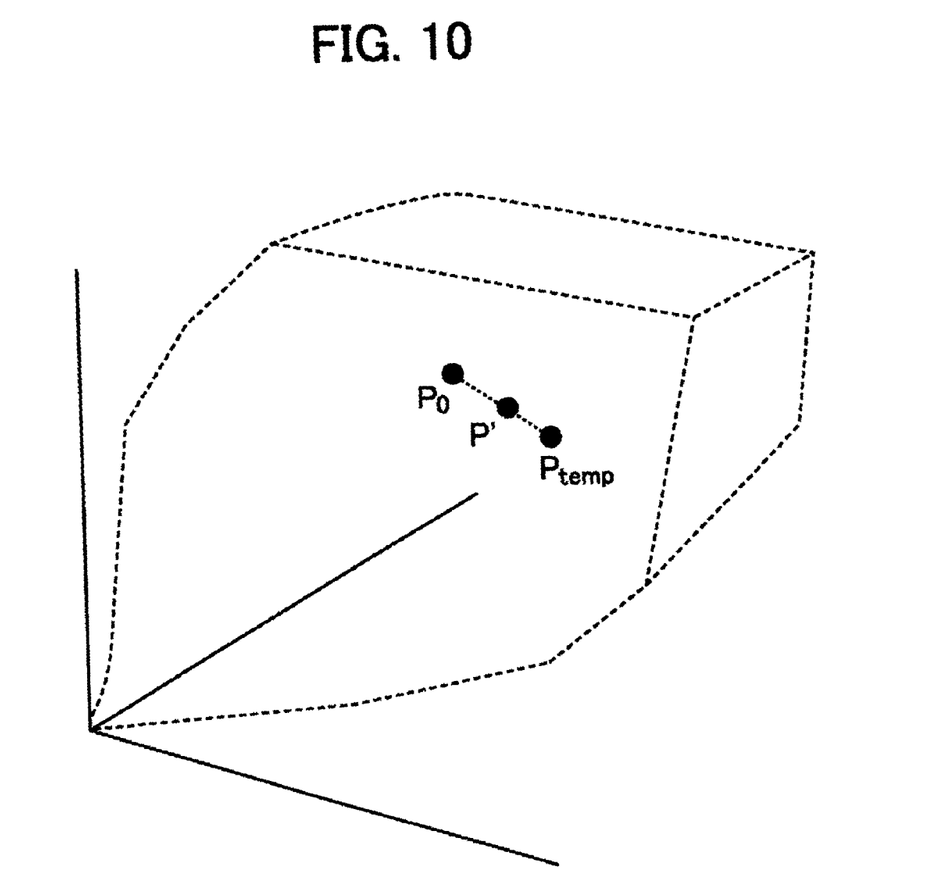
FIG. 10 is a diagram, which shows the relation between color values before smoothing, after temporary smoothing, and after smoothing.

FIG. 10 shows the relation between the color P0 (RGB value) before smoothing, Ptemp after temporary smoothing, and P' after adjustment in the RGB color space. As shown in FIG. 10, the adjusting unit 23 (FIG. 7) performs adjustment so that the line from the color point P0 before smoothing up to the color point Ptemp after temporary smoothing passes through the color point P', obtained after adjustment. Subsequently, in Step S906, the adjusting unit 23 stores the adjusted RGB value in the color correction table 13. In Step S907, it is determined whether the smoothing process has ended for all the values of the color correction table 13. If the smoothing process has not ended, the processing shown in Steps 901 through 906 is repeated. If the smoothing process has ended for all the values in the color correction table 13, the smoothing processing for the color correction table 13 ends.

Figure 11:
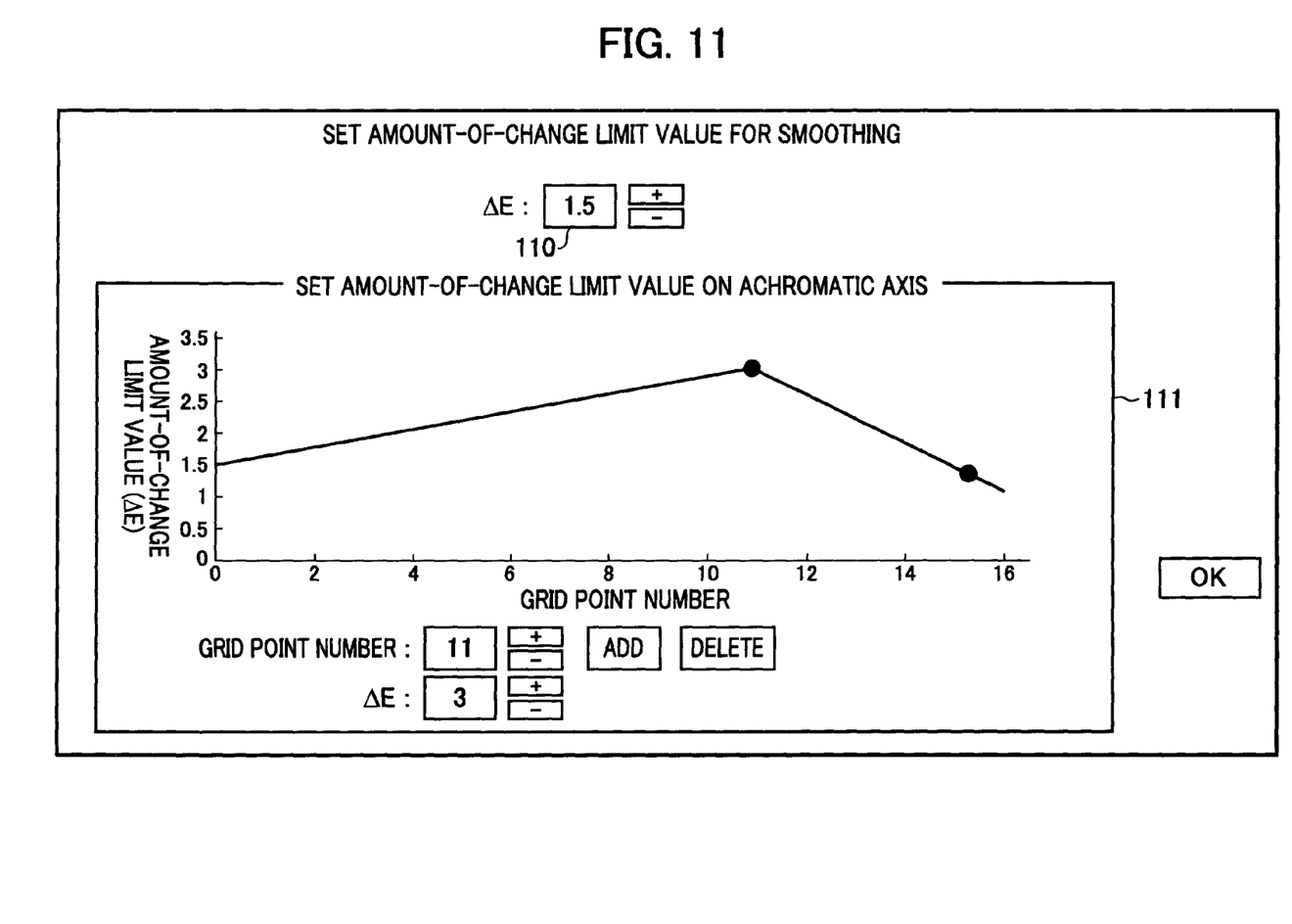
FIG. 11 is a diagram, which illustrates an example of a display screen for setting limit values as to the amount of change due to smoothing.

Note that an arrangement may be made wherein individual amount-of-change limit values are each set for achromatic color and other colors. FIG. 11 shows an example of the display screen for the amount-of-change limit value setting unit 20 in a case of setting individual amount-of-change limit values for achromatic color and other colors. In FIG. 11, reference numeral 110 denotes an item for setting the amount-of-change limit value for colors other than achromatic color. Reference numeral 111 denotes an item for setting the amount-of-change limit value for achromatic color, wherein the user can set the amount-of-change limit value for an arbitrary grid point on the achromatic axis. With regard to other grid points positioned between the grid points where the amount-of-change limit values have been set, an amount-of-change limit value is calculated by interpolation, and the calculated results are displayed as a chart as shown in FIG. 11. As for the interpolation method, linear interpolation, or non-linear interpolation using a spline function or the like may be employed.

Furthermore, while description has been made regarding an arrangement wherein the distance in the Lab space, i.e., the color difference ΔE is employed for the amount-of-change limit value, the amount-of-change limit value may be defined in the shape of the distance in other color spaces such as the RGB space or the like.

With the above-described method, the user can set an arbitrary limit to the change in the value due to smoothing. Furthermore, with regard to the values on the achromatic axis, in the event that the value deviates from the achromatic axis due to smoothing, the value is temporarily projected onto the achromatic axis, followed by the above-described adjustment processing, whereby the change in value is limited while keeping the value achromatic.

Other Embodiments

The present invention is not restricted to the above-described first and second embodiments; rather, various modifications such as those described below may be made, for example.

In the above-described embodiments, while description has been made regarding an arrangement wherein the smoothing process is performed for the data stored in the color correction table in the RGB color space, an arrangement may be made wherein the smoothing process is performed in other color spaces such as Lab, CMY, or the like.

Note that the present invention may be applied to a system made up of multiple devices (e.g., host computer, interface device, reader, printer, and the like), or may be applied to an apparatus made up of one device (e.g., photocopier, facsimile, or the like).

Furthermore, an arrangement may be made wherein a system or a device includes a storage medium storing the program code of software for executing the functions according to the above-described embodiments, and a computer (CPU or MPU) of the system or device reads out the program code stored in the storage medium so as to execute the program code, whereby the processing according to the present invention is performed.

Figure 12:
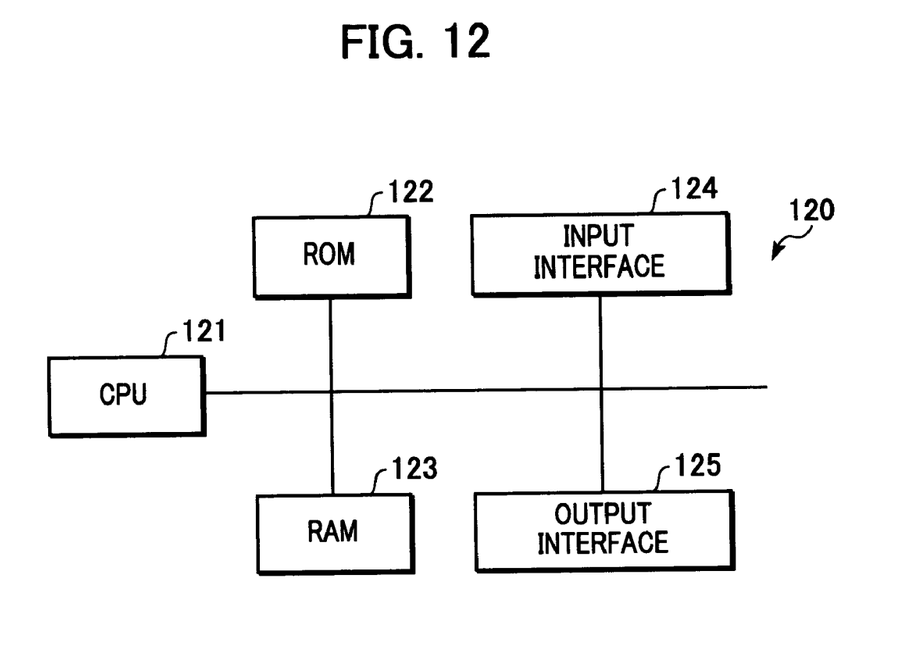
FIG. 12 is a block diagram, which illustrates a configuration of a computer according to another embodiment of the present invention.

Referring to FIG. 12, a modification of the present invention as applied to computer 120 will now be described. As shown in FIG. 12, the computer 120 comprises a CPU 121, ROM 122, RAM 123, an input interface 124, and an output interface 125. The input interface is connected to a user input device (not shown). Here, the input unit 24 shown in FIG. 7 may be employed as the user input device. Furthermore, the output interface is connected to an unshown display unit or printer. Here, the display unit may display the display screen shown in FIG. 8 or FIG. 11. With the computer 120, the program for controlling smoothing described in the above-described embodiments with reference to FIG. 5 or 9 is stored in the ROM 122 serving as a storage medium, and the program is executed by the CPU 121.

In this case, the program code itself read out from the storage medium executes the functions of the above-described embodiments, and accordingly, the storage medium, which stores the program code, is a configuration of the present invention.

As an example of the storage medium for providing the program code, other than the aforementioned example, a floppy (R) disk, hard disk, optical disk, magneto-optic disk, CD-ROM, CD-R, magnetic tape, non-volatile memory card, or the like, may be employed.

Furthermore, the present invention is modifiable such that program code is written to memory included in a function expansion board inserted to the computer or in a function expansion unit connected to the computer, following which a CPU or the like included in the function expansion board or in the function expansion unit executes all or a part of the actual processing according to the instructions of the program code, whereby the functions according to the above-described embodiments are executed.

As described above, even values on the gray axis can be subjected to smoothing based upon surrounding colors while keeping the values in achromatic color. Thus, artifacts can be reduced on a gradation image containing the color components around the gray axis, and furthermore, noise can be suppressed in images containing gray components, thereby improving image quality.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for compiling a color correction table, the method comprising:
    receiving an input color value of a color space stored in the color correction table;
    smoothing the input color value to provide a first color value;
    in the event that the first color value does not correspond to achromatic color due to the smoothing and the input color value is achromatic color, adjusting the first color value to provide a second color value corresponding to the achromatic color;
    comparing a difference between the second color value and the input color value with a limit value; and
    adjusting the second color value in line with an achromatic axis of the color space when the difference is greater than the limit value.

2. The method of claim 1, wherein the limit value is set individually for each of achromatic color and other colors.

3. The method of claim 1 further comprising providing a control program and a computer for executing said method for compiling a color correction table.

4. The method of claim 3 further comprising providing a storage medium for storing said control program.

5. A device for compiling a color correction table having color values in a color space, the device comprising:
    a smoothing unit for performing smoothing of an input color value of the color space stored in the color correction table to provide a first color value; and
    a correction unit for adjusting the first color value into a second color value corresponding to achromatic color in the event that the input color value corresponds to achromatic color and the first color value does not correspond to achromatic color due to the smoothing, the correction unit comparing a difference between the second color value and the input color value with a limit value, and adjusting the second color value in line with an achromatic axis of the color space when the difference is greater than the limit value.

6. The device of claim 5 further comprising a display screen for displaying value differences before and after smoothing is performed on the input color value.

7. A software product embodied on a medium readable by a machine and capable of causing the machine to adjust a color correction table, the software product comprising:
    program code for smoothing an input color value stored in the color correction table to provide a first color value; and
    program code for modifying the first color value, in response to the input color value being achromatic and the first color value being chromatic, such that a second color value that is achromatic is generated for storage in the color correction table, the program code for modifying including program code for comparing a difference between the second color value and the input color value with a limit value, and program code for adjusting the second color value in line with an achromatic axis of the color space when the difference is greater than the limit value.

8. The software product of claim 7, wherein the limit value is set individually for each of achromatic color and other colors.

9. The software product of claim 7 further comprising program code for controlling the software product on a computer.

10. The software product embodied on a medium readable by a machine of claim 7, wherein the machine comprises a computer.

11. The software product embodied on a medium readable by a machine of claim 7, wherein the machine comprises a photocopier.

12. The software product embodied on a medium readable by a machine of claim 7, wherein the machine comprises a facsimile machine.

* * * * *